(12) United States Patent
Saka et al.

(10) Patent No.: US 7,320,716 B2
(45) Date of Patent: Jan. 22, 2008

(54) METHOD FOR TOUGHENING SURFACE OF SINTERED MATERIAL CUTTING TOOL AND SINTERED MATERIAL CUTTING TOOL HAVING LONG LIFE

(75) Inventors: Hiroyasu Saka, Aichi (JP); Won-Jin Mooni, Daejeon (JP); Shouji Uchimura, Aichi (JP); Toshiro Ito, Aichi (JP)

(73) Assignees: Japan Science and Technology Agency (JP); National University Corporation Nagoya University (JP); Sintokogio Ltd. (JP)

( * ) Notice: Subject to any disclaimer, the term of this patent is extended or adjusted under 35 U.S.C. 154(b) by 104 days.

(21) Appl. No.: 10/553,849

(22) PCT Filed: May 18, 2004

(86) PCT No.: PCT/JP2004/007042

§ 371 (c)(1),
(2), (4) Date: Oct. 20, 2005

(87) PCT Pub. No.: WO2004/103615

PCT Pub. Date: Dec. 2, 2004

(65) Prior Publication Data

US 2006/0213127 A1    Sep. 28, 2006

(30) Foreign Application Priority Data

May 26, 2003  (JP)  ............................. 2003-147171

(51) Int. Cl.
*B24D 3/02*  (2006.01)
*C09C 1/68*  (2006.01)
*C09K 3/14*  (2006.01)

(52) U.S. Cl. ........................................ 51/307
(58) Field of Classification Search ................ 501/97.1
See application file for complete search history.

(56) References Cited

U.S. PATENT DOCUMENTS

| | | | | |
|---|---|---|---|---|
| 4,366,254 A | * | 12/1982 | Rich et al. ................. | 501/89 |
| 5,916,833 A | * | 6/1999 | Suzuki et al. .............. | 501/87 |
| 6,133,182 A | * | 10/2000 | Sasaki et al. .............. | 501/127 |
| 6,659,647 B2 | * | 12/2003 | Sugiyama et al. ........ | 384/114 |
| 2003/0027707 A1 | * | 2/2003 | Yamamoto et al. ....... | 510/127 |
| 2003/0162483 A1 | * | 8/2003 | Saka et al. ................ | 451/41 |
| 2004/0067839 A1 | * | 4/2004 | Nawa et al. .............. | 501/105 |

FOREIGN PATENT DOCUMENTS

WO    WO 02/24605    *  3/2002

* cited by examiner

*Primary Examiner*—J. A. Lorengo
*Assistant Examiner*—Pegah Parvini
(74) *Attorney, Agent, or Firm*—H. Jay Spiegel; Robert L. Haines

(57) ABSTRACT

A ceramics sintered material cutting tool, characterizing in that it has a dislocation structure which formed on the surface thereof in a straight line from and distributed uniformity in a dislocation density of $1\times10^4$ to $9\times10^{13}$ $cm^{-2}$. The cutting tool is improved in a fracture toughness value and the resistance to thermal shock and thus has a prolonged life. The above cutting tools include, in particular, a twist drill and a throw away tip.

7 Claims, 1 Drawing Sheet

METHOD FOR TOUGHENING SURFACE OF SINTERED MATERIAL CUTTING TOOL AND SINTERED MATERIAL CUTTING TOOL HAVING LONG LIFE

FIELD OF THE INVENTION

The present invention relates to a method for surface toughening of a ceramics sintered material cutting tool by improving fracture toughness, fracture resistance and thermal shock resistance of said ceramics sintered material cutting tool by forming a linear dislocation structure which is distributed uniformly in the sub-surface regions of the ceramics sintered material cutting tool using a shot blasting treatment, which is a plastic working at room temperature. Further the present invention relates a ceramics sintered material cutting tool whose surface is toughened by forming a linear dislocation structure distributing uniformly on the surface of product.

BACKGROUND OF THE INVENTION

Recently, requirement for high-speed, high-effective working is becoming more serious in various industries, and the improvement of machine tools is remarkable. Along with the improvement of rotating speed of machine, edge temperature of a tool of machines elevates at cutting works and a sphere where ceramic tools are applied is broadly expanding, and a development of a ceramic tool is progressing. Especially, in the application of cutting tool such as drill, end mill, bite or throw away tips that the mounting/dismounting is freely made to various cutting tools, ceramic products are recognized as a promising material for tools applicable for high-speed cutting because of its excellent heat resistance, wear resistance and chemical stability, and is utilized for the manufacture of the tool for cutting work of cast iron. Recently, the ratio of a ceramic tool in the field of a cutting tool becomes about 10%.

However, a ceramic material is a brittle material and has weak points that chip and crack are easy to be generated. As an important feature to be required to a ceramic material tool, wear resistance and fracture resistance (fracture toughness) can be mentioned. When the wear resistance is bad, it is necessary to change a cutting tool frequently, and the productivity is deteriorated. Further, when the fracture resistance is bad, the sintered material is fractured at the cutting process and spoils the machined surface of the work. For the purpose to improve the cutting efficiency, it is necessary to prolong the life of a cutting edge so as to endure the long term use.

Accordingly, in a cutting tool composed of materials such as cemented carbide or ceramics, prolonging the life of a cutting edge is investigated by improving wear resistance or corrosion resistance of the cutting edge part by partially inserting a high pressure sintered materials such as cubic boron nitride or sintered diamond to the cutting edge, or treating by a specific heat treatment or coating by titanium carbide, titanium nitride, alumina or diamond like carbon.

In JPA H4-331070 publication (Document 1), invention relating a method to prolong the life of tool by making the surface structure of a cutting tool fine and minute that is composed of cemented carbide, SKH (high-speed tool steels) of hardening alloy steels, SKD (alloy tool steels) or carbon steels for machine structural use, SCM by blasting spherical abrasives of 300 mesh (approximately 50 μm) to 800 mesh (approximately 20 μm) particle size with air blow of 3-10 Kg/cm² to the surface of said cutting tool is disclosed. The inventors of the present invention are already proposed in JPA 2002-300765 publication (filed on Oct. 15, 2002, Document 2), a method for surface toughening of a ceramic product comprising, forming uniformly distributed linear dislocation structure in the sub-surface regions of the ceramic product by using abrasives composed of fine particles having convexly curved surface and having an average particle size of 0.1 μm to 200 μm and a Vickers hardness (HV) of 500 or more and of a hardness (HV) of the ceramic products +50 or less, and a ceramic products whose surface is toughened. Further, in W. Pfeiffer and T. Frey, "Shot Peening of Ceramics: Damage or Benefit", Ceramic forum international Cfi/Ber, DkG 79 No. 4, E25 (2002) (Document 3), toughening of ceramics by shot blasting is reported and a relationship between blasting materials, blasting pressure and toughening characteristic is investigated. However, method to adjust a shot blasting condition according to the relationship between formation of dislocation density of linear dislocation structure distributed uniformly measured by a transmission electron microscope and thermal shock resistance is not referred in this document.

Recently, the cutting conditions for cast iron or heat-resistance alloy are becoming more severe, and in a rough turning working or a milling cutter working, high-speed cutting over 1000 m/min is required. Further, in a case of high-speed cutting, the temperature of cutting edge becomes 1000° C. or more, ("Ceramics Engineering Handbook (2$^{nd}$ edition)" (Application) edited by Ceramic Society of Japan, Mar. 31, 2002 printed by GIHODO SHUPPAN Co., Ltd., p. 1285-1292, especially p. 1290, Document 4), and interrupted cutting processes are repeated in said condition, therefore an excellent thermal shock resistance is required. However, a conventional cutting tool characterized by inserting a high pressure sintered materials in a cutting edge part or by coating treatment with high hardness film has a problem that can not endure against such a severe high-speed cutting condition and causes fracture or delamination of coated film.

The subject of the present invention is to provide a method for the manufacture of tools whose heat resistance required in said cutting working is improved and whose life time is prolonged and to provide tools whose properties mentioned above are improved.

Aiming to accomplish said subject, the inventors of the present invention investigated whether the technique disclosed in the Document 2 by the inventors of the present invention can be applied for the improvement of said properties, and confirmed that fracture toughness, fracture resistance and thermal shock resistance can be improved and cutting tools whose life time is improved can be obtained, and accomplished above mentioned subject.

DISCLOSURE OF THE INVENTION

The 1$^{st}$ one of the present invention is (1) a method for surface toughening of a ceramics sintered material cutting tool comprising, forming uniformly distributed linear dislocation structure in the sub-surface regions of the ceramics sintered material cutting tool by using abrasives composed of fine particles having convexly curved surface and having an average particle size of 0.1 μm to 200 μm and a Vickers hardness (HV) of 500 or more and a hardness (HV) of +50 or less which is the hardness of said sintered material cutting tool. Desirably, the 1$^{st}$ one of the present invention is (2) the method for surface toughening of a ceramics sintered material cutting tool of (1), wherein a plastic working is carried out by shot blasting pressure of 0.1 to 0.5 MPa, shot blasting speed of 20 m/sec to 250 m/sec, shot blasting amount of 50 g/m to 800 g/m and shot blasting time of 0.1 sec/cm$^2$ or more to 60 sec/cm$^2$ or less, more desirably, the 1$^{st}$ one of the present invention is (3) the method for surface toughening of a ceramics sintered material cutting tool of (1) or (2), wherein the dislocation density of uniformly distributed linear dislocation structure in the sub-surface regions of the ceramics sintered material cutting tool is in the range of from $1\times10^4$ to $9\times10^{13}$ cm$^2$.

The 2$^{nd}$ one of the present invention is (4) a long life ceramics sintered material cutting tool possessing a structure whose dislocation density of uniformly distributed linear dislocation structure in the sub-surface regions of the ceramics sintered material cutting tool is in the range of from $1\times10^4$ to $9\times10^{13}$ cm$^{-2}$.

Figure 1:
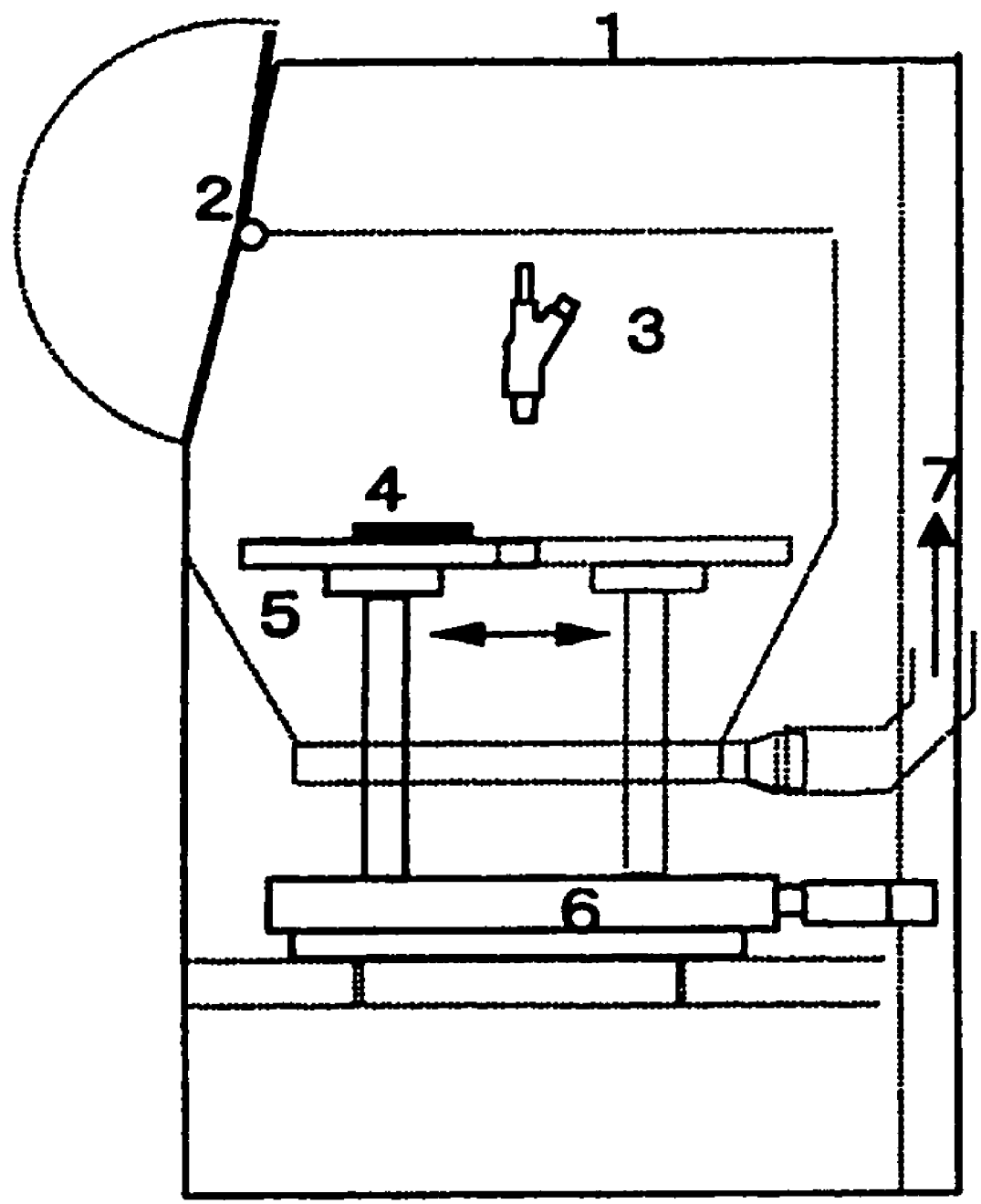
In FIG. 1, toward a sintered material cutting tool product 4, which is a work held to a product holding part consisting of a table 5 which can be moved toward X-Y direction by a X-Y table driving part 6, it is possible to blast a selected abrasive particles for plastic working suited to said work from a blasting nozzle 3 by controlling blasting pressure or blasting amount of the abrasive particles. The blasting nozzle can be made movable to X-Y direction instead of moving of said table 5. Used abrasive particles for plastic working is recovered by a recovering apparatus 7 and separated from deteriorated blasting material and reused. Said abrasive particles can be shot blasted with air or with liquid like as a liquid honing. They are stored in a cabinet 1 with a cabinet door 2.

The present invention will be illustrated more in detail.

I. As an apparatus to carry out shot blasting treatment to a cutting tool, apparatus mentioned in above Document 2 can be mentioned. The apparatus mentioned in said Document 2 is Microblaster MBI type apparatus (nozzle diameter: 8 Φ mm, shot blasting distance: 150 mm), product of SINTOBRATOR Ltd, which can stabilize the processing accuracy by quantitative supply of fine particles. Plastic working (shot blast treatment) of the present invention can apply basically a method disclosed in said document 2. That is, blasting treatment conditions such as blasting pressure, blasting speed, blasting amount and blasting time are adjusted not to injure the surface of a ceramic product to be treated. Further, as fine particles to be used for shot blast treatment, fine particles selected from the view point that has a surface shape not to injure the work material and has a Vickers hardness (HV) lower than that of the material composing ceramic product to be treated can be used.

Compared with the art disclosed in said Document 2, the present invention is characterized as an art to produce a ceramics sintered material cutting tool made of ceramics whose surface is toughened, for example, "SNGN120408" throw away tips of silicon nitride to be used for a turning is used as a toughening treated sintered ceramics and to obtain a product whose life time is improved by said toughening treatment.

As an example of a toughening treated sintered ceramics cutting tool, products made of ceramics of silicon nitride or alumina, and high hardness particles distributed composite material such as hard metal and cermet can be mentioned.

II. As mentioned above, In FIG. 1, toward the sintered material cutting tool product 4, which is a work held to a product holding part consisting of a table 5, a selected abrasive particles for plastic working suited to said work material is blasted from a blasting nozzle 3 by controlling blasting pressure or blasting amount of the plastic working abrasive particles. By making the blasting nozzle movable to X-Y direction, same effect can be obtained. Used abrasive particles for plastic working are recovered by a recovering apparatus 7, separated from deteriorated abrasive particles and recycled. Abrasive particles can be jetted with gas or with liquid like as liquid honing. The restriction of blasting speed from 20 m/sec to 250 m/sec is the condition to jet the abrasive particles vertically toward the surface of specimen at the measurement of fracture toughness of blasting treatment. Further, the lower limit of the blasting speed is the restriction from the view point of workability of the plastic working (shot blasting) treatment and the upper limit of the blasting speed is the limit to restrict the range in which a defect such as chipping does not occur.

III. The particle size of abrasive particles for plastic working is an important factor relating to the improvement of fracture toughness $K_{IC}$ of the sintered material cutting tool product. Further, the finer particle size promises easier treatment by plastic working of the present invention for a ceramic product having complex surface shape.

For designing plastic working blasting treatment which is a surface toughening structure forming plastic working, it is desirable to design considering specific features required to a ceramic product to be treated by changing size of abrasive particles for plastic working, hardness or shot blasting pressure, or changing combinations of these factors.

EXAMPLES

Measuring apparatuses, evaluation method used for the investigation of specific features of the toughened ceramics product prepared by a toughening working method are illustrated as follows.

a. Dislocation density and structure: Thin film specimen for TEM observation is prepared by an Focused Ion Beam Apparatus (Hitachi F-2000) and the structural characteristics is observed by a transmission electron microscope (TEM) JEOL-200CX (accelerating voltage: 200 kV), product of JAPAN ELECTRON OPTICS LABORATORY CO., Ltd. Dislocation density can be obtained by measuring the dislocation length per unit volume. Concretely, the dislocation density is measured by following procedure, that is, (1) measure the thickness of a thin film specimen, (2) take a TEM observation picture of the point where dislocation density is measured, (3) measure the length of dislocation contained in the unit volume.

b. Fracture toughness; Fracture toughness is measured based on Indentation-Fracture method (IF method) prescribed in JIS R 1607.

The specimen is ground and polished by a diamond abrasive paper of #600, #1000, #3000 in order then by 1 μm alumina suspension so as to obtain surface roughness of 0.2 S or less.

Using a Vickers hardness tester, the optimal value of indentation load is selected from 5 kgf, 10 kgf and 50 kgf according to a quality of the testing material. Holding time of load is set to 15 sec.

By measuring the diagonal length of indentation mark and length of crack generates from 4 corners of indentation mark (2c, unit; m), fracture toughness value is calculated by following numerical formula.

$$K_{IC}=0.018(E/HV)^{1/2}(P/c^{3/2})$$

Wherein, $K_{IC}$ is fracture toughness (MPa·m$^{1/2}$), E is Young modulus (Pa), HV is Vickers Hardness (Pa), P is pressing load (N), c is the half of the total length of a crack (m).

c. Evaluation of fracture resistance of the obtained sintered ceramics cutting tool: Using a specimen of tip shape of SNGN120408 and chamfer 0.085, and a work material is cast iron (Mark; FC200). Under dry condition, and by condition of cutting speed; 150 mm/min, depth of cut; 2.0 mm, feeding speed; 1.0 mm/min, cutting is carried out and continued until a fracture causes. Number of worked mountains until a fracture is observed is 20 or more is evaluated as ◎ (excellent), from 10 to 19 is evaluated as ○ (good) and less than 9 is evaluated as X (rejected). In examples mentioned below, indication mentioned above is used. In the description, number of worked mountains means the number of mountains can be cut without fracture of the specimen of tip shape when cutting of mountains is carried out interruptedly, wherein the mountains are formed on a work by engraving plural grooves on the work.

"SNGN120408" is a mark indicating dimension of tip put on according to the "naming of throw away tip" of nega-tip shape prescribed in ISO 1832 indication. "S" is a mark for shape and indicates that the shape of tip is square. "N" is a mark for angle of relief and indicates that the angle of relief is 0°. Further, "G" is a mark of accuracy indicating that the dimensional allowances (unit; mm) are ±0.025 by diameter of inscribed circle, ±0.13 mm by thickness of tip and ±0.025 by corner height. "N" is a mark for groove•hole, and indicates that there is no groove•hole. "12" is a mark for length of cutting edge and indicates that the diameter of inscribed circle (unit; mm) is 12.70. Then "04" is a mark for thickness and indicates that the thickness (unit; mm) is 4.76. "08" of the tail is a mark for corner and indicates that the radius of corner (unit; mm) is 0.8.

d. Evaluation of thermal shock resistance: Using a square test piece of JIS specimen size (3×4×40 mm), an experiment of thermal shock resistance is carried out on above mentioned ceramics materials. According to thermal shock resistance test prescribed in JIS standard (JIS R1615), a test piece which is expanded by heat is thrown in water (30° C.). The surface of the test piece which contacts with water is cooled down by water and is tending to shrink, however, the inside which does not contact with water maintains high temperature, and internal stress (tensile) causes. Said action is repeated by elevating heating temperature gradually (150° C.-1000° C.), and the temperature where crack is caused in the test piece by this thermal shock is investigated.

The explanation of following Examples intending to easy understanding of the present invention and not intending to limit the scope of the present invention.

Examples 1-6, Comparative Example 1

As the ceramics product to be processed, a specimen of silicon nitride whose hardness is 1380HV and bending strength is 1100 MPa is used.

"SNGN120408" throw away tip of this silicon nitride and a square test piece of JIS test piece size (3×4×40 mm) are set to a shot blasting apparatus and processed to form dislocation structure mentioned above under various shot blasting conditions mentioned in Table 1 using various fine particles having convexly curved surface mentioned in Table 1. Using obtained ceramics sintered material cutting tools working is carried out on a cast iron specimen by above mentioned cutting condition, and evaluated by above mentioned evaluating method. Results are indicated according to above mentioned standard.

TABLE 1

Characteristics of silicon nitride after surface toughening treatment

| | specimen | | abrasives | | | shot blasting condition blasting | | | | | surface roughness Ra μm | | hardness HV | | fracture toughness | ratio of improvement of $K_{IC}$ | thermal shock resistance |
|---|---|---|---|---|---|---|---|---|---|---|---|---|---|---|---|---|---|
| No | material | hardness HV | bending strength MPa | material | size μm | hardness HV | pressure MPa | amount g/min | speed m/s | time sec/cm² | before process | after process | before process | after process | location density/cm² (after process) | $K_{IC}$ MPa·m$^{1/2}$ | | fracture resistance | tance temp. ° C. |
| Co. 1 | si- | 1380 | 1100 | — | — | — | — | — | — | — | — | — | — | — | 5.70 | 1.00 | X | 750 |
| Ex. 1 | licon ni- | 1380 | 1100 | zircon | 200 | 810 | 0.4 | 400 | 50 | 12 | 0.012 | 0.141 | 1478 | 3.9 × 10$^{10}$ | 5.86 | 1.03 | X | — |
| Ex. 2 | tride | 1380 | 1100 | zircon | 200 | 810 | 0.4 | 400 | 50 | 24 | 0.012 | 0.185 | 1484 | 2.9 × 10$^{11}$ | 6.28 | 1.10 | X | — |

TABLE 1-continued

Characteristics of silicon nitride after surface toughening treatment

| No | specimen material | hardness HV | bending strength MPa | abrasives material | size μm | hardness HV | shot blasting condition pressure MPa | amount g/min | speed m/s | time sec/cm² | surface roughness Ra μm before process | surface roughness Ra μm after process | hardness HV (after process) | dislocation density/cm² | fracture toughness $K_{IC}$ MPa·m$^{1/2}$ | ratio of improvement of $K_{IC}$ | fracture resistance | thermal shock resistance temp. °C |
|---|---|---|---|---|---|---|---|---|---|---|---|---|---|---|---|---|---|---|
| Ex. 3 | | 1380 | 1100 | mullite | 100 | 1020 | 0.2 | 400 | 45 | 12 | 0.012 | 0.339 | 1426 | $7.7 \times 10^{12}$ | 9.53 | 1.67 | ○ | — |
| Ex. 4 | | 1380 | 1100 | mullite | 100 | 1020 | 0.4 | 400 | 60 | 12 | 0.012 | 0.582 | 1534 | $5.4 \times 10^{12}$ | 9.92 | 1.74 | ○ | — |
| Ex. 5 | | 1380 | 1100 | mullite | 100 | 1020 | 0.4 | 400 | 60 | 36 | 0.012 | 0.823 | 1549 | $3.1 \times 10^{13}$ | —*) | — | — | — |
| Ex. 6 | | 1380 | 1100 | zirconnia | 50 | 1380 | 0.2 | 600 | 50 | 4 | 0.012 | 0.185 | 1503 | $6.3 \times 10^{13}$ | 13.95 | 2.45 | ◎ | 950 |

Co.: Comparative Example
Ex.: Example
$K_{IC}$: fracture toughness
*)can not calculate because of chipping From the results of Table 1, it is clearly understood that the fracture toughness of the processed products of the present invention is improved in proportion to dislocation density formed on the surface of specimen after shot blasting treatment at room temperature. Further, it is recognized that fracture resistance is greatly changed before and after treatment, and the relationship is recognized with that whose fracture toughness is large. Still further, in Example 6, when thermal shock resistance is compared with that of Comparative Example 1, it is obvious that the thermal shock resistance is greatly improved. Example 5, in which very high dislocation density is formed on the surface of specimen after shot blasting treatment, since chipping is caused on the surface of specimen, measurement of fracture toughness is impossible. Reason why is considered as follows. That is, when the number of dislocation increased, cracks based on reactions between dislocations are generated and chippings become easily caused.

Examples 7-10, Comparative Example 2

As the ceramics product to be processed, a specimen of alumina whose hardness is 1700HV and bending strength is 375 MPa is used.

"SNGN120408" throw away tip of this alumina is set to the shot blasting apparatus and processed to form dislocation structure mentioned above under various shot blasting conditions mentioned in Table 2 using various fine particles having convexly curved surface mentioned in Table 2. Using obtained ceramics sintered material cutting tools working is carried out on a cast iron specimen by above mentioned cutting condition, and evaluated by above mentioned evaluating method. Results are indicated according to above mentioned standard.

TABLE 2

Characteristics of alumina after surface toughening treatment

| No | specimen material | hardness HV | bending strength MPa | abrasives material | size μm | hardness HV | shot blasting condition pressure MPa | amount g/min | speed m/s | time sec/cm² | surface roughness Ra μm before process | surface roughness Ra μm after process | hardness HV (after process) | dislocation density/cm² | fracture toughness $K_{IC}$ MPa·m$^{1/2}$ | ratio of improvement of $K_{IC}$ | fracture resistance | thermal shock resistance temp. °C |
|---|---|---|---|---|---|---|---|---|---|---|---|---|---|---|---|---|---|---|
| Co. 2 | alumina | 1700 | 375 | — | — | — | — | — | — | — | — | — | — | — | 2.97 | 1.00 | X | 200 |
| Ex. 7 | mina | 1700 | 375 | zircon | 200 | 810 | 0.35 | 400 | 50 | 12 | 0.233 | 0.249 | 1716 | $4.7 \times 10^8$ | 3.10 | 1.04 | X | — |
| Ex. 8 | | 1700 | 375 | mullite | 100 | 1020 | 0.35 | 400 | 60 | 12 | 0.209 | 0.287 | — | $6.7 \times 10^{13}$ | —*) | — | — | — |
| Ex. 9 | | 1700 | 375 | zirconnia | 20 | 1380 | 0.25 | 600 | 60 | 8 | 0.227 | 0.246 | 1770 | $5.9 \times 10^{11}$ | 7.67 | 2.58 | ○ | — |

TABLE 2-continued

Characteristics of alumina after surface toughening treatment

| No | specimen material | hardness HV | bending strength MPa | abrasives material | size μm | hardness HV | shot blasting condition pressure MPa | amount g/min | speed m/s | time sec/cm² | surface roughness Ra μm before process | surface roughness Ra μm after process | hardness HV (after process) | dislocation density/cm² | fracture toughness $K_{IC}$ MPa·m$^{1/2}$ | ratio of improvement of $K_{IC}$ | fracture resistance | thermal shock resistance temp. °C |
|---|---|---|---|---|---|---|---|---|---|---|---|---|---|---|---|---|---|---|
| Ex. 10 | | 1700 | 375 | zirconnia | 50 | 1380 | 0.15 | 600 | 50 | 4 | 0.259 | 0.263 | 1890 | $7.3 \times 10^{12}$ | 10.88 | 3.66 | ⊚ | — |

Co.: Comparative Example
Ex.: Example
$K_{IC}$: fracture toughness
*)can not calculate because of chipping From the results of Table 2, it is recognized that fracture resistance is greatly changed before and after treatment, further the relationship is recognized with that whose fracture toughness is large. Further, similar to Examples 1-6 using a silicon nitride specimen, it is clearly understood that the fracture toughness of the processed products of the present invention is improved in proportion to dislocation density formed on the surface of a specimen after shot blasting treatment at room temperature. Still further, In Example 10, when thermal shock resistance is compared with that of Comparative Example 2, it is obvious that the thermal shock resistance is greatly improved. In Example 8, similar to the Example 5 using a silicon nitride specimen, in which very high dislocation density is formed on the surface of specimen after shot blasting treatment, since chipping is caused on the surface of specimen, measurement of fracture toughness is impossible. Reason why is considered as follows. That is, when the number of dislocation increased, cracks based on reactions between dislocations are generated and chippings become easily caused.

Examples 11-14, Comparative Example 3

As a material to be treated, a cemented carbide (WC-10% Co) whose hardness is 1600HV and bending strength is 2000 MPa is used.

"SNGN120408" throw away tip of this cemented carbide is set to the shot blasting apparatus, and shot blasting treatment is carried out vertically from thickness direction to the surface of a specimen. Measurement of dislocation density by TEM observation, measurement of fracture toughness are carried out, and fracture resistance is evaluated. In Table 3, conditions for plastic working (shot blasting) and results of characteristics of the cemented carbide before and after treatment are summarized.

TABLE 3

Characteristics of cemented alloy after surface toughening treatment

| No | specimen material | hardness HV | bending strength MPa | abrasives material | size μm | hardness HV | shot blasting condition pressure MPa | amount g/min | speed m/s | time sec/cm² | surface roughness Ra μm before process | surface roughness Ra μm after process | hardness HV (after process) | dislocation density/cm² | fracture toughness $K_{IC}$ MPa·m$^{1/2}$ | ratio of improvement of $K_{IC}$ | fracture resistance |
|---|---|---|---|---|---|---|---|---|---|---|---|---|---|---|---|---|---|
| Co. 3 | cemented | 1600 | 2000 | — | — | — | — | — | — | — | — | — | — | — | 12.93 | 1.00 | X |
| Ex. 11 | mented | 1600 | 2000 | zircon | 200 | 810 | 0.35 | 400 | 50 | 2.4 | 0.012 | 0.017 | 1620 | $2.6 \times 10^8$ | 14.42 | 1.12 | X |
| Ex. 12 | | 1600 | 2000 | zirconnia | 20 | 1380 | 0.35 | 400 | 65 | 0.8 | 0.011 | 0.015 | 1630 | $2.8 \times 10^{11}$ | 19.20 | 1.48 | ○ |
| Ex. 13 | | 1600 | 2000 | zirconnia | 50 | 1380 | 0.15 | 600 | 50 | 0.8 | 0.011 | 0.028 | 1651 | $5.9 \times 10^{12}$ | 23.32 | 1.80 | ⊚ |
| Ex. 14 | | 1600 | 2000 | zirconnia | 50 | 1380 | 0.25 | 600 | 55 | 0.8 | 0.012 | 0.030 | 1673 | $8.1 \times 10^{12}$ | 28.10 | 2.17 | ⊚ |

Co.: Comparative Example
Ex: Example
$K_{IC}$: fracture toughness

From the results of Table 3, it is recognized that fracture resistance is greatly changed before and after treatment, further the relationship is recognized with that whose fracture toughness is large. Further, similar to above mentioned test results, it is clearly understood that the fracture toughness of the processed products of the present invention is improved in proportion to dislocation density formed on the surface of a specimen after shot blasting treatment at room temperature. Especially, fracture toughness of Example 14 using cemented carbide is 28, and this value exceeds fracture toughness level 13 of cemented carbide which is recognized to have high toughness, that is, toughening effect to be surprised is achieved.

INDUSTRIAL APPLICABILITY

As mentioned above, when surface treatment is carried out by a shot blasting treatment, which is relatively easy method, the surface of a tool causes a plastic deformation and dislocation is introduced on the surface of the tool, and fracture toughness and thermal shock resistance are improved. Consequently, excellent effect that the life of the tool is remarkably improved can be provided. In Examples, silicon nitride, alumina and cemented carbide are mentioned as examples, however not limited to these materials, and of cause can be applied to a tool of cermet or complex material such as cemented carbide in which high hardness materials are dispersed.

What is claim is:

1. A method for surface toughening of a ceramics sintered material cutting tool comprising, plastic working said ceramics sintered material cutting tool with an abrasive composed of fine particles, said fine particles having a convexly curved surface and an average particle size of 0.1 µm to 200 µm and a Vickers hardness (HV) ranging from 500 to a value which is the hardness of said sintered material cutting tool plus 50, whereby a uniformly distributed linear dislocation structure is formed in subsurface regions of the ceramics sintered material cutting tool, said plastic working being carried out by shot blasting said sintered material cutting tool with said abrasive particles at a pressure of 0.1 to 0.5 MPa, a shot blasting speed of 20 m/sec to 250 m/sec, a shot blasting amount of 50 g/m to 800 g/m and a shot blasting time of 0.1 sec/cm$^2$ or more to 60 sec/cm$^2$ or less.

2. The method for surface toughening of a ceramics sintered material cutting tool of claim 1, wherein the dislocation density of uniformly distributed linear dislocation structure in the sub-surface regions of the ceramics sintered material cutting tool is in the range of from $1\times10^4$ to $9\times10^{13}$ cm$^{-2}$.

3. A method for surface toughening of a ceramics sintered material cutting tool comprising plastic working said cutting tool with an abrasive composed of fine particles, said particles having a convex curved surface, an average particle size of 0.1 µm to 200 µm and a Vickers hardness (HV) ranging from 500 to a value which is the hardness of said sintered material cutting tool plus 50, said plastic working being carried out by shot blasting said sintered material cutting tool with said abrasive particles at a pressure of 0.1 to 0.5 MPa, a shot blasting speed of 20 m/sec to 250 m/sec, a shot blasting amount of 50 g/m to 800 g/m and a shot blasting time of 0.1 sec/cm$^2$ or more to 60 sec/cm$^2$ or less, whereby a uniformly distributed linear dislocation structure is formed in subsurface regions of the ceramics sintered material cutting tool.

4. The method of claim 3 wherein the dislocation density of uniformly distributed linear dislocation structure in the subsurface regions of the ceramics sintered material cutting tool is in the range of from $1\times10^4$ to $9\times10^{13}$ cm$^{-2}$.

5. The method of claim 3 wherein the abrasive particles are selected from the group consisting of zircon, zirconia and mullite.

6. The method of claim 3 wherein the surface toughened ceramics sintered material cutting tool is made of ceramics of silicon nitride or alumina or of high hardness distributed composite material.

7. The method of claim 1 wherein the hardness of said abrasive particles is less than the hardness of said ceramics sintered material cutting tool.

* * * * *